United States Patent
Gerakoulis et al.

(10) Patent No.: US 6,711,121 B1
(45) Date of Patent: Mar. 23, 2004

(54) ORTHOGONAL CODE DIVISION MULTIPLEXING FOR TWISTED PAIR CHANNELS

(75) Inventors: Diakoumis Parissis Gerakoulis, Dover, NJ (US); Evaggelos Geraniotis, Potomac, MD (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/413,162

(22) Filed: Oct. 6, 1999

Related U.S. Application Data
(60) Provisional application No. 60/103,774, filed on Oct. 9, 1998.

(51) Int. Cl.[7] .................................................. H04J 5/04
(52) U.S. Cl. ...................... 370/205; 370/208; 370/533; 370/539; 375/144; 375/242
(58) Field of Search .................................. 370/479, 208, 370/320, 327, 335, 342, 441, 533, 535, 536, 537, 538, 539, 540, 541, 465–468, 482, 485, 484, 493–495; 375/204–211, 146, 260, 285, 296, 144, 242–254; 341/100, 101; 710/71

(56) References Cited

U.S. PATENT DOCUMENTS

| | | | | |
|---|---|---|---|---|
| 4,145,575 A | * | 3/1979 | Shida et al. ................. 370/482 |
| 5,406,551 A | * | 4/1995 | Saito et al. .................. 370/203 |
| 5,479,447 A | * | 12/1995 | Chow et al. ................. 375/260 |
| 5,574,721 A | * | 11/1996 | Magill ......................... 370/342 |
| 5,781,542 A | * | 7/1998 | Tanaka et al. ............... 370/342 |
| 5,999,542 A | * | 12/1999 | Turner et al. ............... 370/497 |
| 6,055,268 A | * | 4/2000 | Timm et al. ................. 375/229 |
| 6,069,922 A | * | 5/2000 | Dyke ........................... 375/285 |
| 6,111,895 A | * | 8/2000 | Miller et al. ................ 370/479 |
| 6,130,884 A | * | 10/2000 | Sato ............................. 370/335 |
| 6,144,696 A | * | 11/2000 | Shively et al. ............. 375/222 |
| 6,157,938 A | * | 12/2000 | Wu et al. .................... 708/404 |
| 6,205,220 B1 | * | 3/2001 | Jacobsen et al. ............ 379/417 |
| 6,243,397 B1 | * | 6/2001 | Yun ............................. 370/480 |
| 6,310,870 B1 | * | 10/2001 | Li ................................ 370/342 |
| 6,317,495 B1 | * | 11/2001 | Gaikwad et al. ............ 379/417 |
| 6,320,842 B1 | * | 11/2001 | Mochizuki ................... 370/206 |
| 6,366,555 B1 | * | 4/2002 | Gatherer et al. ............ 370/210 |
| 6,366,588 B1 | * | 4/2002 | Gans et al. .................. 370/468 |
| 6,370,160 B1 | * | 4/2002 | Knutson et al. ............. 370/503 |
| 6,393,052 B2 | * | 5/2002 | Sadjadpour et al. ........ 375/222 |
| 6,400,776 B1 | * | 6/2002 | Matthews .................... 375/298 |
| 6,418,161 B1 | * | 7/2002 | Shively et al. .............. 375/222 |
| 6,456,657 B1 | * | 9/2002 | Yeap et al. ............. 375/240.12 |

* cited by examiner

*Primary Examiner*—Douglas Olms
*Assistant Examiner*—Van Nguyen
(74) *Attorney, Agent, or Firm*—Henry T. Brendzel

(57) ABSTRACT

A plurality of data signals are separated into parallel bit streams with each parallel stream having a bandwidth characteristic such that the combined cumulative effect of all the individual bandwidths produces a spectral characteristic of the data signals that match the spectral high speed data characteristic of a twisted pair.

12 Claims, 9 Drawing Sheets

ORTHOGONAL CODE DIVISION MULTIPLEXING FOR TWISTED PAIR CHANNELS

This application claims the benefit of Provisional application Ser. No. 60/103,774, filed Oct. 9, 1998.

FIELD OF THE INVENTION

This invention relates to high-speed data transmission over a twisted pair local access connection. It is specifically concerned with matching of power spectra density of a high rate data channel with a transfer function of a twisted pair.

BACKGROUND OF THE INVENTION

High-speed data transmission over a twisted pair (i.e., subscribers local access line) such as HDSL, as it is presently carried out, uses transmission procedures full of complexity. Such complexities include multicarrier modulation, multitone transmission and orthogonal frequency division. These processes are all susceptible to external interference and to crosstalk.

Transmission of signal s(t) in a Twisted pair is subject to various types of interference including near end crosstalk (NEXT), which affects high speed data transmission. Multiple channels may be transmitted over a single twisted pair, but may interfere with one another. Twisted pair channels must be substantially orthogonal to one another in order to limit interference between channels.

A functional diagram of these interferences is shown in the FIG. 1A, where an input lead 101 represents application of the data signal s(t) to the twisted pair. The twisted pair may be characterized by a transfer function that is related to the absolute square of the functional value $H_c(f)$, which represents an attenuation characteristic at the twisted pair, and is proportional to $\sqrt{f}$. In addition, there is significant interference from NEXT, represented by $H_a(f)$. Far end crosstalk, FEXT, is relatively very low compared to NEXT and is not included in the model.

The input and the NEXT are applied to mixer 107 that represents the interaction of the signals. The output on lead 109 represents the amalgam of the data signal plus the interference signals.

The effect of this interference of the twisted wire attenuation of signals is shown by the graph of FIG. 1B where coordinate axis 100 of the log of signal frequency is plotted against a coordinate axis 102 representing attenuation in dB.

Curve 111 represents the attenuation of the data signal as function of frequency. Curve 113 represents the increase of NEXT as frequency increases. It is apparent that as the data signal attenuates with increasing frequency, and the interference signal increases with the increasing frequency. NEXT is a dominant portion of this interference. Other forms of interference include narrow band radio interference. All these interferences contribute to the frequency limits of the twisted pair. In a typical instance 95% of twisted wire capacity is below 10 kHZ and 60% of capacity is below 40 kHZ.

SUMMARY OF THE INVENTION

A plurality of data signals are separated into parallel bit streams, with each parallel stream having a bandwidth characteristic such that the combined cumulative effect of all the signals with individual bandwidths produce spectral characteristics of the data signals that can accommodate and emulate the spectral high speed data transmission characteristic of a twisted pair.

In a particular embodiment parallel data streams resulting from a serial to parallel conversion of an input data stream and multiplexing into a number of parallel symbol streams, including data transmitted at different data rates are each individually spread to a different bandwidth so that the combined effect of the selected bandwidths has a spectral distribution resembling the spectral transmission characteristic of a twisted pair.

A proposed embodiment based on Orthogonal Code Division Multiplexing (OCDM) performs two essential steps: (1) performing a serial to parallel conversion of a serial input into a plurality of orthogonal serial streams each having different chip rates, and (2) loading of each of the paralleled streams by adaptive modulation. These two steps are combined with spreading code generation techniques to achieve high-speed data transfer over twisted pair.

Each individual paralleled stream is spread to a different bandwidth, with the narrowest bandwidth having the highest modulation loading and the broadest bandwidth having the lowest modulation loading. The selected modulation technique in one embodiment is pulse amplitude modulation with no carrier. Adaptive loading of the signal streams (loading refers to a matrix dimensionality of a modulating signal) is selected and applied to distribute the power spectra so that it matches the twisted pair transfer function. Each stream may represent different services.

Fundamentally the concepts of the OCDM scheme is a serial-to-parallel conversion (i.e., multi-codes) and overspreading (i.e., spectral matching). An input data stream is serial-to-parallel converted to parallel branches. Each branch is transmitted with spreading orthogonal codes applied. The number of parallel branches N is equal to the spreading gain of these orthogonal codes. Spectral matching to the channel is preceded by an overspreading of the chips of the spreading orthogonal code. Overspreading is recursive with a (+,−) pattern. Different powers are assigned to different levels. Different levels of overspreading are orthogonal to each other. Serial-to-parallel codes may be reused in spreading and overspreading in different channels of overspreading according to a spectral matching desired.

An advantage of the coding scheme is that it is effective in rejecting radio interference even with unshielded twisted pair.

DETAILED DESCRIPTION

Figure 1A:
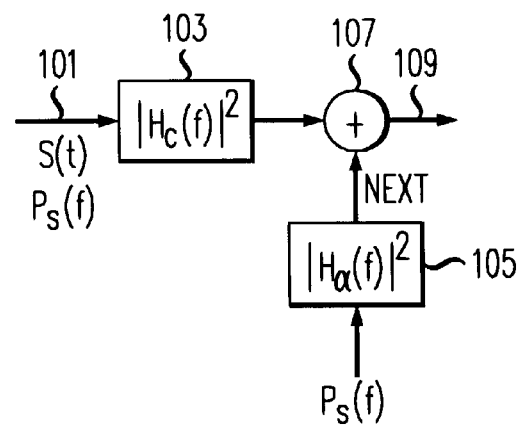
FIG. 1A is a functional block schematic of a twisted pair channel subject to interference including near end crosstalk (NEXT)
Figure 1B:
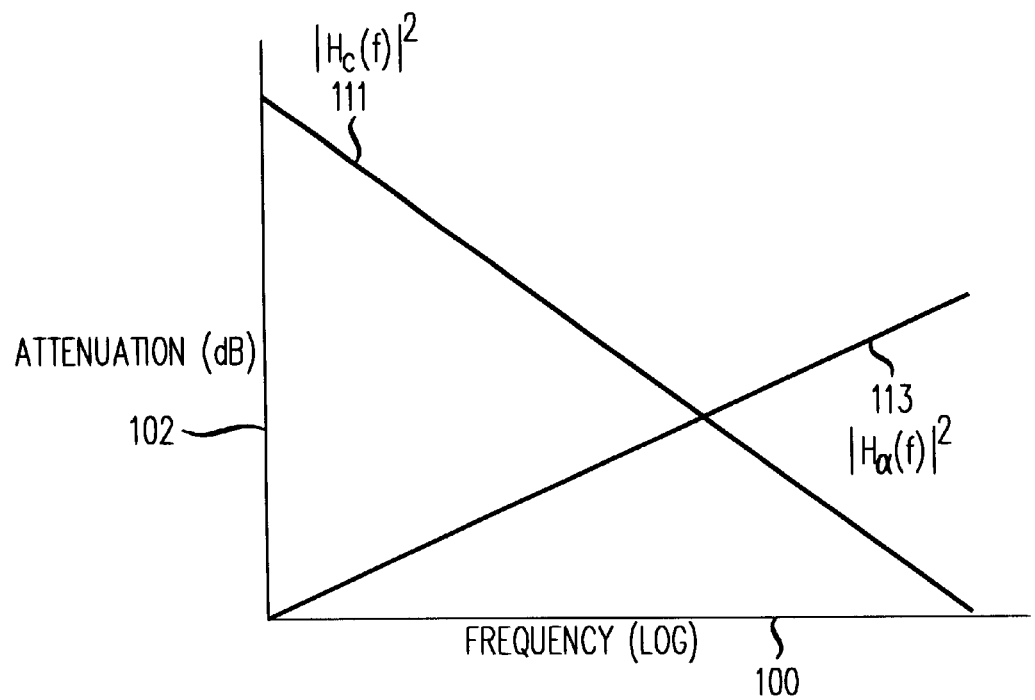
FIG. 1B is a graph of the frequency and attenuation response of the twisted pair channel functionally shown in FIG. 1A.

In accord with the principles disclosed herein, data transmissions are distributed by frequency so that the highest data load is at lower frequencies, where the capacity is high, and the lowest data load is transmitted at high frequencies. Orthogonal Code Division Multiplexing (OCDM) is utilized to achieve this objective. Multiplexing of existing low bit rate services are multiplexed with high data rate T1 service. In a particular embodiment the OCDM is a carrierless baseband system with adaptive pulse amplitude modulation (PAM) loading.

The drawing and text uses various symbols in the various descriptions. These symbols are as follows:

W: the overall Twisted Pair Channel (TPC) useful bandwidth;

$R_c$: The basic chip rate;

M: The total number of baseband sub-rate OCDM components (groups of branches) set to match power spectral density of the channel;

$R_c, 2R_C, 4R_c, \ldots 2^{m-1}R_c$ are chip rates used by M groups of OCDM with the relationship between basic chip rate and total OCDM bandwidth as:

$$R_c = \frac{2W}{2^{M-1}}$$

N: processing gain associated with the basic chip rate; also the number of OCDM parallel data streams and of orthogonal codes used.

$N_1, N_2, \ldots N_M$: numbering of parallel data streams out of N used in each branch.

$N_m$ corresponds to a group of branches m whose signal has a chip rate and bandwidth $2^{(m-1)}$ for m=1,2, . . . ,M $L_m$ is a measure of the order of data modulation (i.e., loading): represents the total number of symbols is used; $l_m = \log_2 L_m$ represents the number of bits per $L_m$-PAM symbol. $L_m$-PAM is used by all $N_m$ data streams or branch m.

Figure 2A:
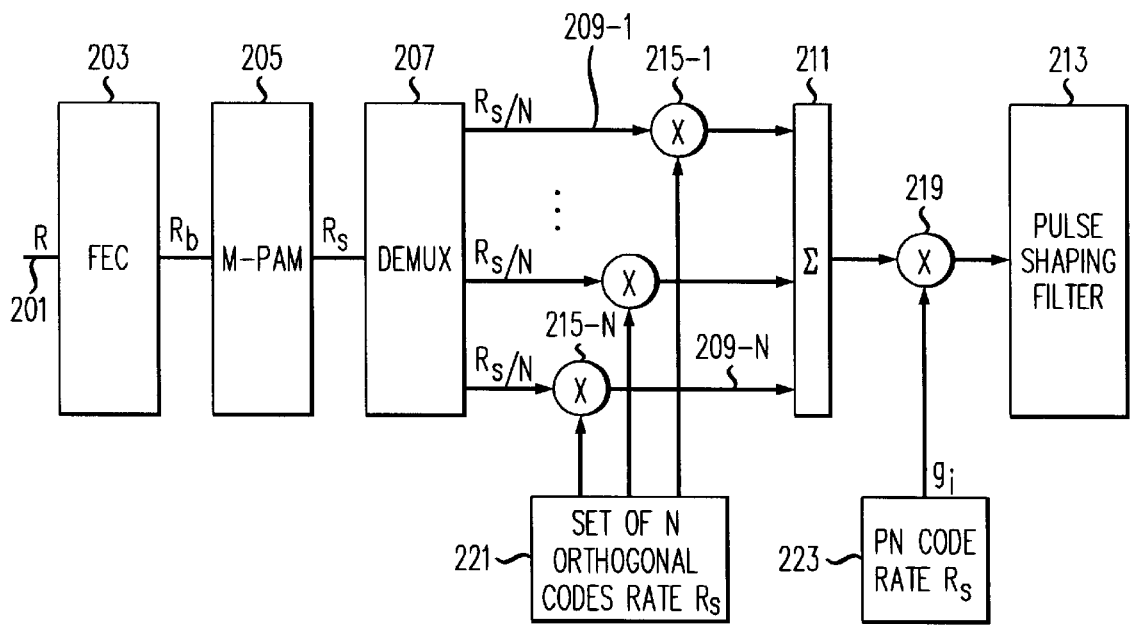
FIG. 2A is a block schematic of an orthogonal coded transmitting processing circuit for optimizing data rates and applying signals to a twisted pair channel.

FIG. 2A shows the circuitry used for conditioning signals for transmission over a twisted pair. An incoming symbol stream of rate R is applied to lead 201. Forward error correction (FEC) is applied in block 203 and the output of FEC block 203 is applied to modulation in block 205, yielding a rate of $R_b$. The FEC-modified and modulated signal is demultiplexed into N parallel symbol streams each having the rate REIN. Each parallel stream i is spread by an orthogonal code $H_i$ where i=1 , . . . N with rate $R_s$. Codes $H_i$ spread all the parallel streams to a common rate $R_s$. The parallel symbol streams are combined (i.e., summed) and multiplied by a PN cover code of rate $R_s$ to provide a white noise spectrum distribution to the symbol signal. A pulse-shaping filter shapes the output pulse so that its power spectral density (PSD) approximates that obtained from a water pouring solution. Water pouring is a concept used in the science of information theory.

If all data sources are linked or co-located, the system does not require system synchronization of the symbol streams. If the symbol sources arise from widely separated source locations, the twisted pair channels (TPC) will be asynchronous, leading to increased interference. Interference between channels may still be reduced by application of the PN cover code. Interference is reduced by a factor of $R_o/N$ where $R_o$ is the symbol rate in another TPC (i.e., twisted pair channels).

As shown in FIG. 2A the input symbol stream at rate R, which may contain many data streams that represent different rates or services, is applied to input lead 201 and to the forward error correction (FEC) circuit 203 to detect, locate, and correct any transmission errors. Its output, at rate $R_b$, is applied to a M-PAM pulse amplitude modulator 205. Modulator 205 maps the FEC output into k-bit blocks, resulting symbols having M levels ($M=2^k$) each. The M-PAM modulator in this embodiment operates at base band and is carrierless.

The M-PAM pulses, having the rate $R_s$, are demultiplexed by demultiplexer 207 into N paralleled streams, each having a rate $R_s/N$, with the signal content of each stream being spread by one of N orthogonal codes (block 221) having a rate $R_s$ in mixers 215-1, . . . , 215-N. The resulting paralleled streams 209-N are summed in summing circuitry 211. The combined signal is cover coded, in mixer 219, with a PN code (block 223) and applied to a pulse-shaping filter 213 to shape output pulses with an appropriate power spectra density.

Figure 2B:
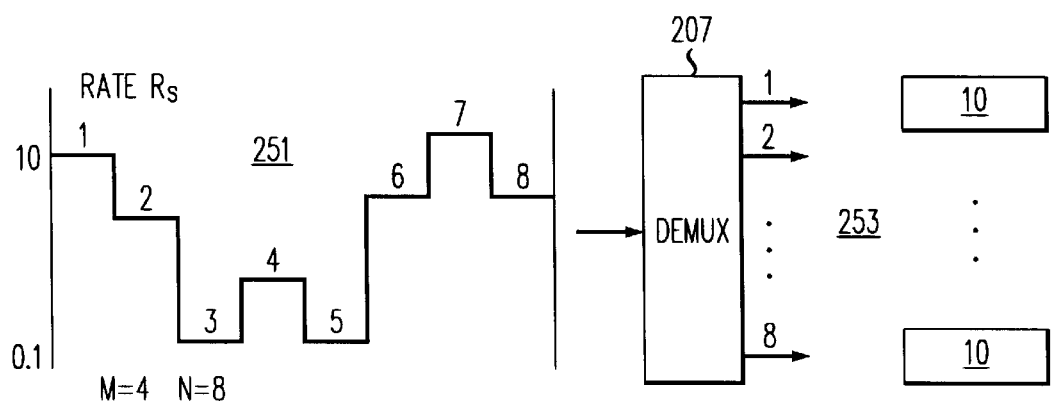
FIG. 2B presents graphs that compare input and output rates of the processing circuit of FIG. 2A.

The graphical displays of FIG. 2B illustrate typical differing code rates as a step function 251 showing different code rates 1 through 8. These code rates are demultiplexed into 8 parallel symbol streams 253 at a rate $R_s$.

In the embodiment shown each paralleled stream m is mixed by orthogonal spreading codes $H_m$ and all streams combined in summer circuit 421 producing the output R/n. The modulating codes $H_m$ are typically multi-dimensional (i.e., matrices of multiple dimensions). In the illustrative embodiment overspreading is performed using all available orthogonal codes so that usage of the codes is complete. This improves spectral matching with the twisted pair.

Figure 3:
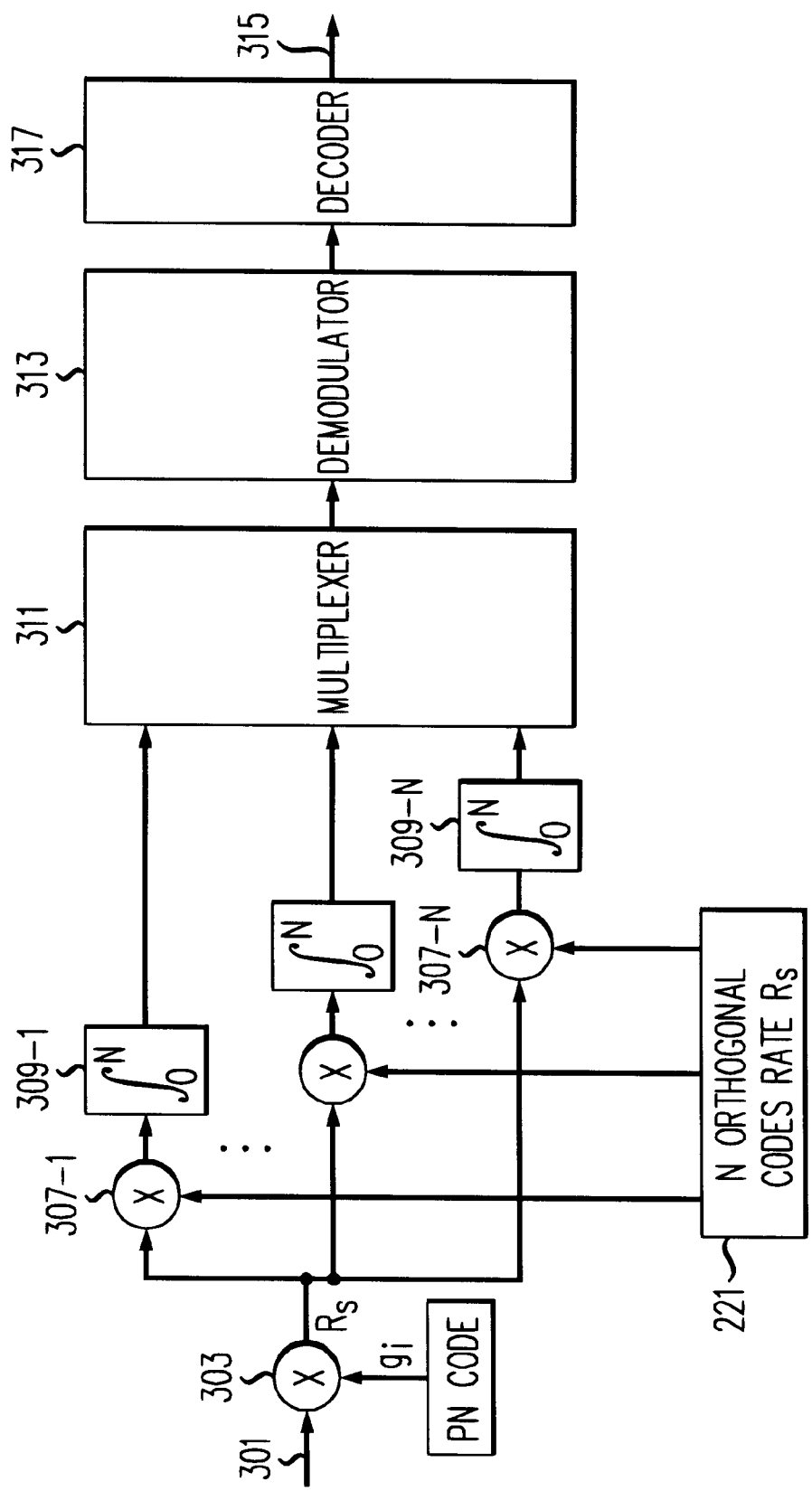
FIG. 3 is a block schematic a receiving terminal for receiving OCDM transmissions from a transmitter such as shown in FIG. 2A.

Signal reception requires an OCDM receiver to recover the individual signals at a termination of the twisted pair. In an OCDM receiver shown in FIG. 3 the received OCDM signal at lead 301 is covered by a applying a PN code $g_i$ at mixer 303 in order to achieve a desired power spectra distribution of the received signal. The covered signal $R_s$ is applied to mixers 307-1, . . . , 307-N. The mixers in response to an applied despreading code and in combination with subsequent associated accumulators 309-1, . . . , 309-N recover the original CDMA signal. The output $R_s/N$ of each accumulator is applied to a multiplexer 311, which recovers the input signal $R_s$, and the signal is subsequently demodulated in the demodulator 313. The demodulated signal is applied to a decoder 317, which decodes the FEC coding and a final output is applied to output lead 315.

Figure 4:
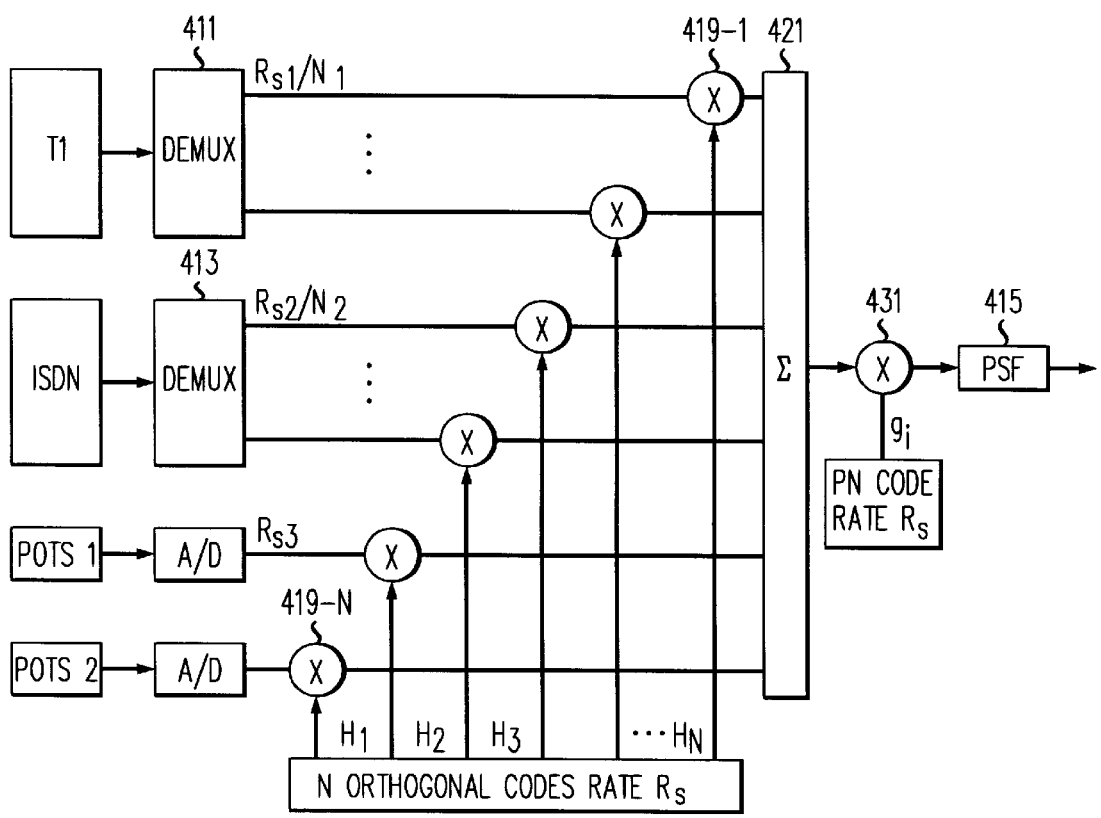
FIG. 4 is a block schematic of a service multiplexing circuit using orthogonal code multiplexing for providing T1, ISDN and POTS services over a twisted pair channel.

The OCDM system provides a method of code multiplexing a number of services for the twisted pair channel. Transmission circuitry suitable for this application is shown schematically in FIG. 4. As shown T1, ISDN, and POTS services are applied to an OCDM transmitter. T1 having a signal rate $R_{s1}$ is applied to a demultiplexer 411 and demultiplexed into $N_1$ parallel streams at rate $R_{s1}/N_1$. $R_{s2}$ is an ISDN signal demultiplexed by demultiplexer 413 and divided into parallel streams having the rate $R_{s2}/N_2$. POTs signals are converted from analog to digital having a rate $R_{s3}$. All of the parallel streams are spread by N orthogonal codes with rate $R_s$, by mixers 419-N and applied to summing circuit 421, which combines all the streams into one stream. A PN cover code of rate $R_s$ is mixed, in mixer 431, with the summer output and the output is filtered with a power spectrum filter 415 to obtain a desired pulse shape. In this manner the provision of multiple services may be provided by code multiplexing.

System efficiency may be greatly enhanced by adaptive loading in which the dimension of modulation is changed, for various individual streams, to control the symbol signal bandwidth within a particular twisted pair channel. The input source data is divided into a number of parallel streams. Each stream is loaded with a different order of modulation. Each of the parallel streams is further demultiplexed into substreams following modulation which are spread and applied to another demultiplex step.

Figure 5:
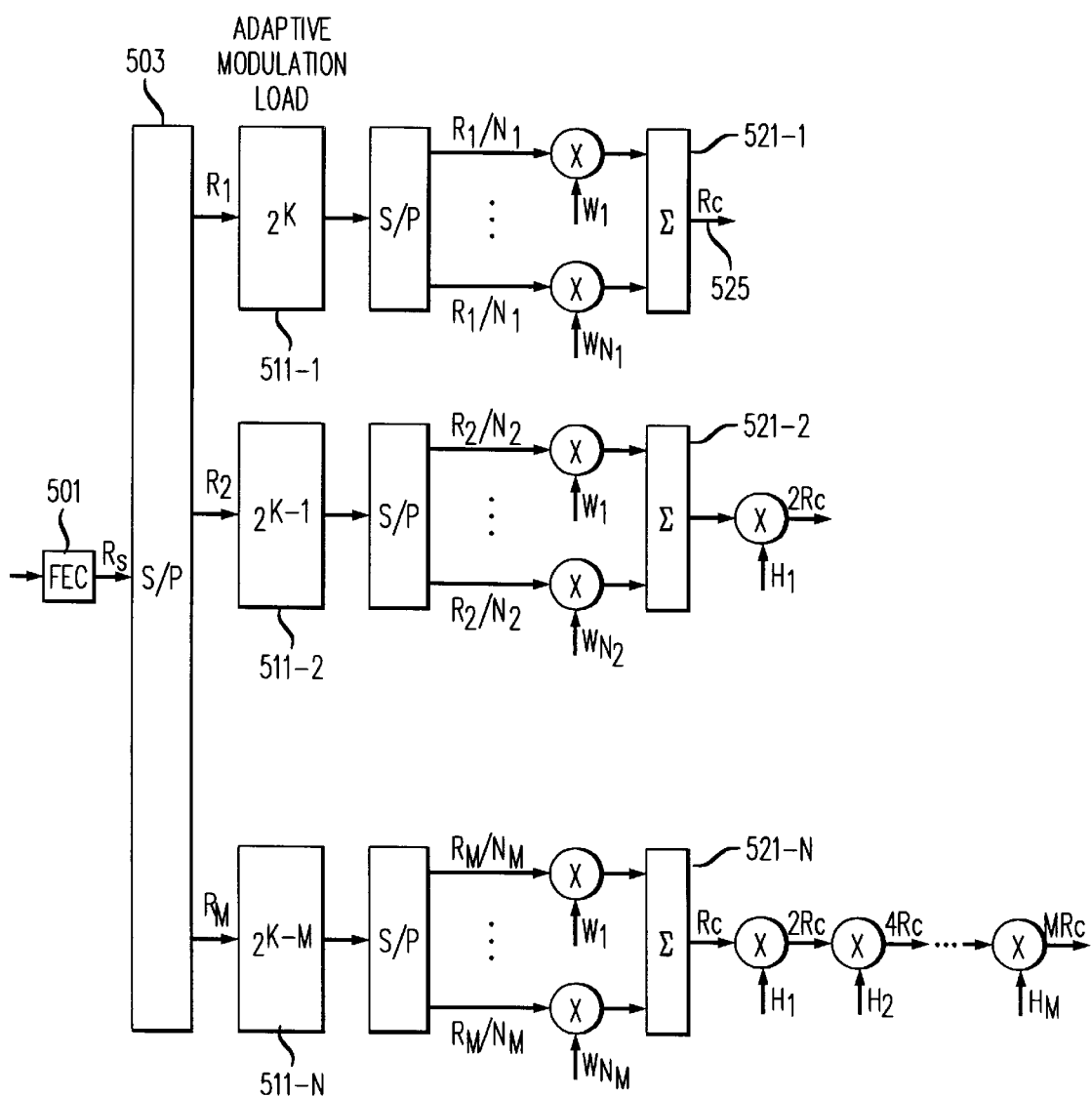
FIG. 5 is a block schematic of a generalized OCDM circuit using adaptive modulation to achieve a spectral density to match a twisted pair transfer function.

A fundamental circuit for distributing bandwidth of various portions of a serial stream to match a twisted pair transfer function is shown in the FIG. 5. A stream is introduced at FEC 501 serial to parallel converter 503 into parallel streams of rates $R_1$, $R_2$ and ending with $R_m$. Each of these streams is adaptively modulated (loaded) in the modulators 511-1, . . . , 511-N to achieve a particular bandwidth characteristic. The paralleled streams are further divided into paralleled substreams $R_j/N_j$ up to $R_m/N_m$, each of the substreams is mixed with Walsh codes $W_{N_M}$, and the multiple outputs of modulators 511-1, . . . , 511-N that are thus augmented are summed in summing circuits 521-1, . . . , 521-N, respectively. A first output on lead 525 is at rate $R_c$. The output of summing circuit 521-2 is mixed with the orthogonal code $H_1$ to achieve an output $2R_c$. The summing circuit 521-N output is multiply mixed with a series of orthogonal codes $H_1$, $H_2$, . . . $H_M$. This combination of mixing and modulation achieves a frequency distribution of the data rates of the incoming stream.

Figure 7:
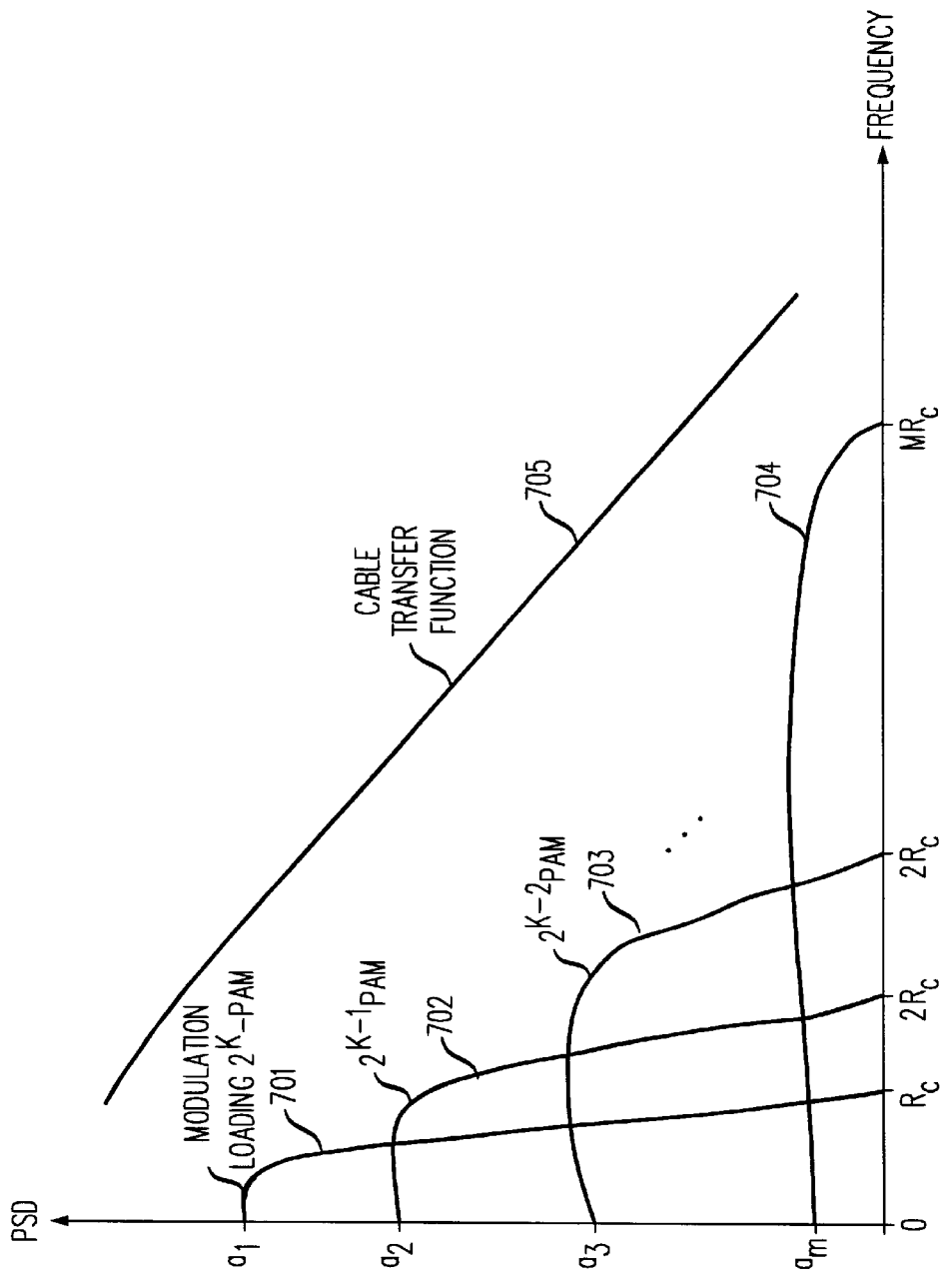
FIG. 7 is a graph of power spectral density for the OCDMs using adaptive loading of modulation and compared with the power spectra characteristic of a twisted pair.

The substreams are spread by orthogonal codes with the code spreading creating bandwidths of different resulting power spectral densities that allow mixing and matching to provide a power spectra characteristic matching that of the twisted pair transfer function. A typical result is as shown in the graph of FIG. 7 wherein the individual power spectra distribution is shown for three data streams for rates of $R_c$, $2R_c$, $4R_c$ and $MR_c$ are shown by curves 701, 702, 703 and 704, respectively. The shape of each of these data streams is due to the pulse-shaping filter. All of the overlapping streams are orthogonal to one another. The sum of powers in each band is adjusted to achieve the desired cumulative effect of all streams in order to match the twisted pair power spectral characteristics. The modulation load is higher at the lower frequencies, which include the most useful channel capacity. It is readily apparent from the FIG. 7 graph that the cumulative effect of the different bands, created by adaptive modulation loading, $R_c$, $2R_c$, and $4R_c$ presents a cumulative component which approximates the transfer characteristic of the twisted pair as indicated by the line 705.

Figure 6A:
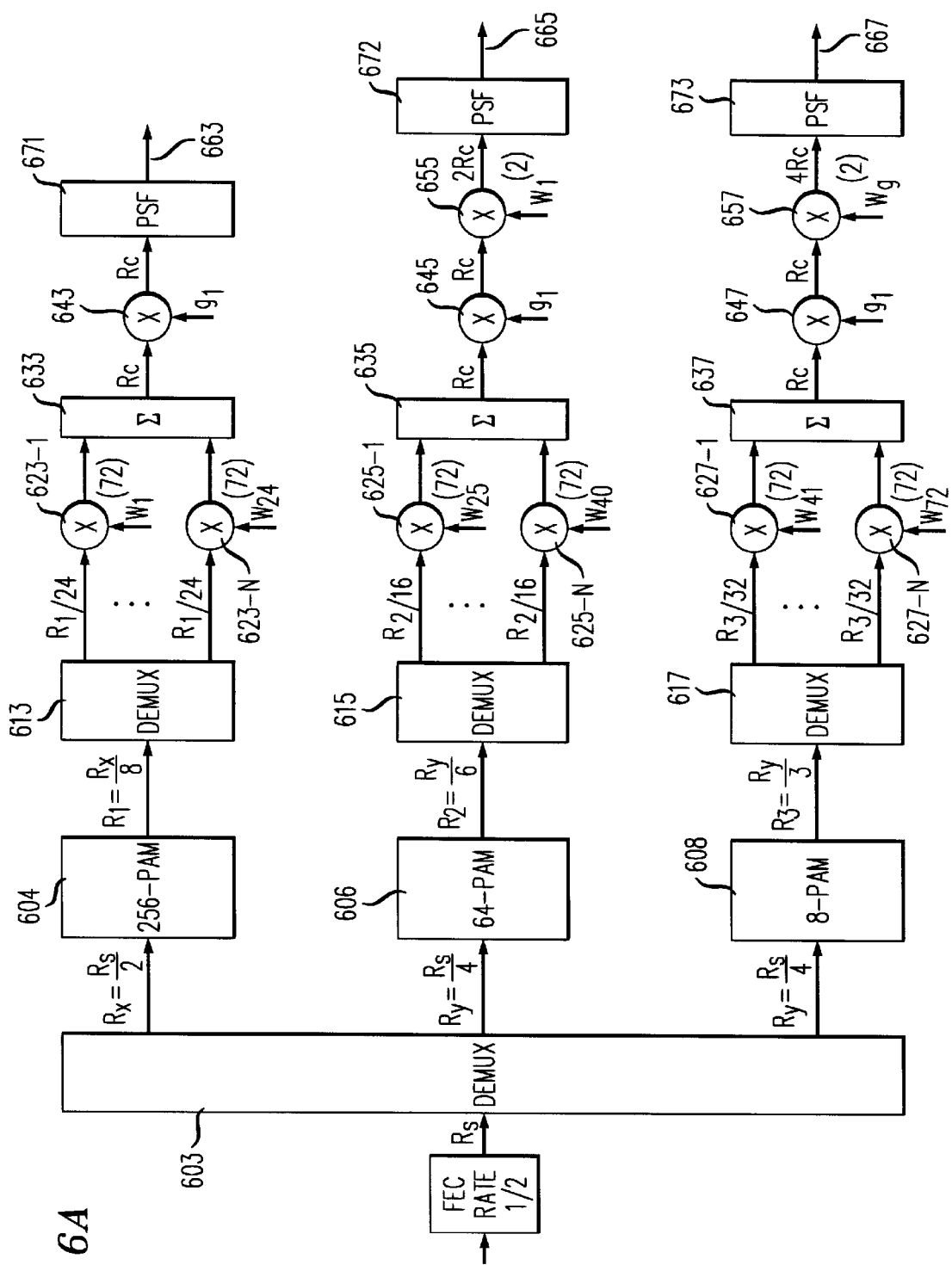
FIG. 6A is a block schematic of a particular example of an OCDM with adaptive loading of the modulation process to achieve a match of the transmitted data power spectra characteristic with that of the twisted pair.

Distribution of bandwidth by adaptive modulation is performed by transmitters, such as shown in FIG. 6A. FEC coded signals $R_s$, from FEC 602 are applied to a demultiplexer 603 generating outputs $R_x=R_s/3$, $R_y=R_s/4$ and $R_y=R_s/4$. These signals are modulated in 256-PAM, 64-PAM and 8-PAM modulators 604, 606 and 608, respectively. Each modulated stream is again demultiplexed by one of the demultiplexers 613, 615 and 617. Demultiplexer 613 generates an output of parallel streams having a rate of $R_1/24$. Demultiplexer 615 generates $R_2/16$ and Demultiplexer 617 generates an output of $R_3/32$.

All the demultiplexed signals are spread by mixers 623-1, . . . ,623-N, 625-1, . . . ,625-N and 627-1, . . . ,627-N and applied to summers 633, 635 and 637, respectively. Their respective outputs are cover coded by PN codes $g_1$ in mixers 643, 645 and 647. The output of mixer 643 is applied to power spectra filter 671, output of mixer 645 is spread with code $W_1$ in mixer 655 and applied to power spectra filter 672, and the output of mixer 647 is spread with coder $W_g$. The outputs of power spectra filters 671, 672 and 673 form the desired loading and bandwidth distribution at outputs 663, 665 and 667, respectively.

Figure 6B:
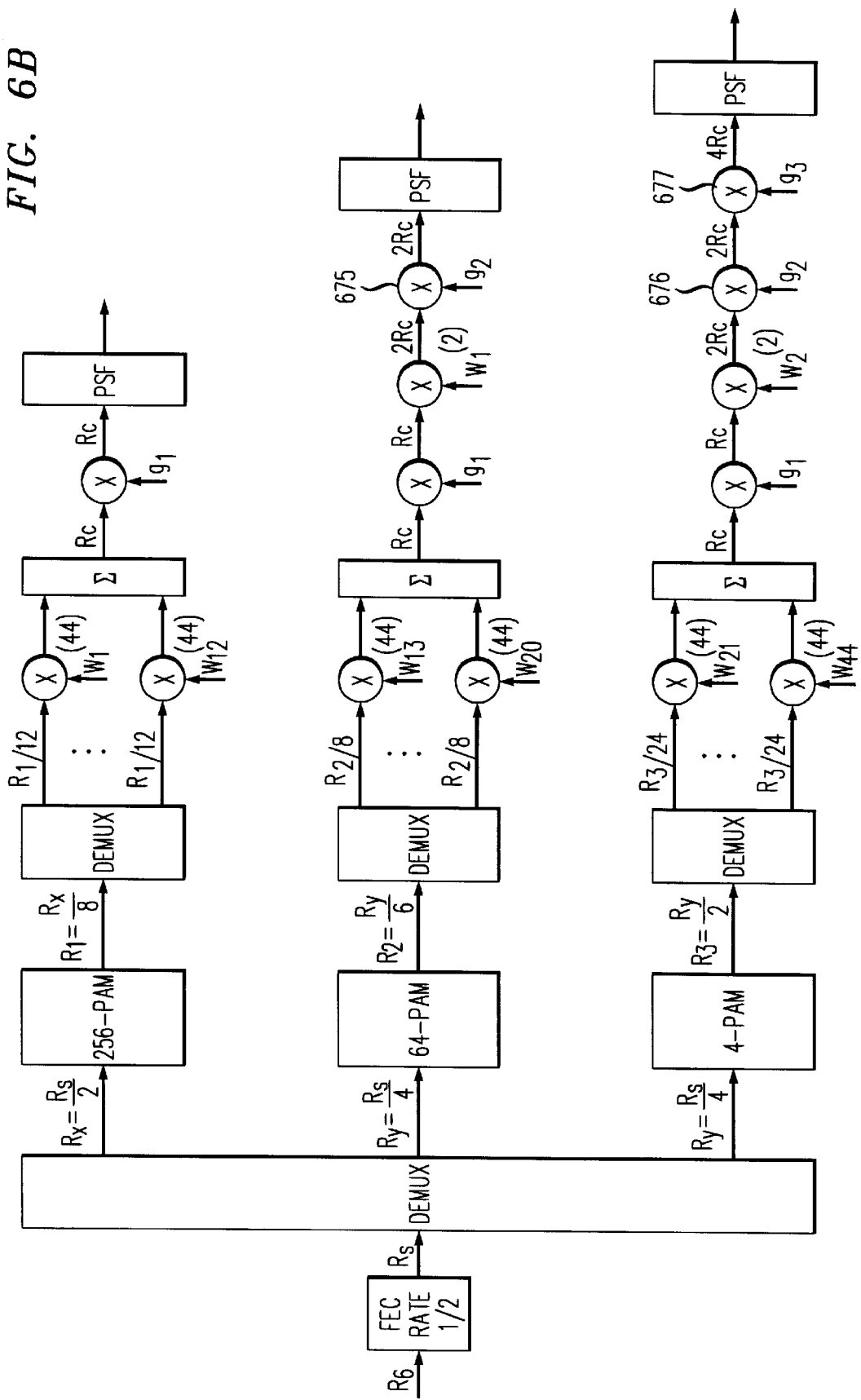
FIG. 6B is a block schematic of a particular example of an OCDM with adaptive loading of the modulation process.

A similar circuit in FIG. 6B is provided with additional mixers 675, 676 and 677 in the output to permit added overspreading of the output by codes $g_2$ and $g_3$. Overspreading as used herein means a re-spreading of a given spread signal of rate R with an orthogonal code having a rate which is an even integer multiple of the spread signal being overspread.

The adaptive loading produces a bandwidth distribution in which narrower spreading bandwidths have a higher order modulation and wider spreading bandwidths have a lower order modulation. As shown in the FIG. 7 graph the spreading bands have overlapping regions but the maintenance of orthogonality prevents significant interference. This approach satisfies the requirements needed for use of the water-pouring scheme which permits maximum utilization of the TPC capacity. Three data streams are shown in the graph and these bands are due to power spectra filtering. In the first frequency band $(O, R_c)$ three data spectra overlap. A second frequency band $(R_c, 2R_c)$ has two overlapping regions. By control of the sum of powers in each band the powers in each band may be regulated so that the overall sum of all the bands approximates the transfer characteristic of the twisted wire pair according to water pouring solutions. Water pouring allows matching of spectral energy with frequency. Both transmit power and pulse shape may be adjusted in each stream and the number of streams delineated may also be adjusted. Modulation loading is highest at lower frequencies where the most channel capacity is located.

Figure 8:
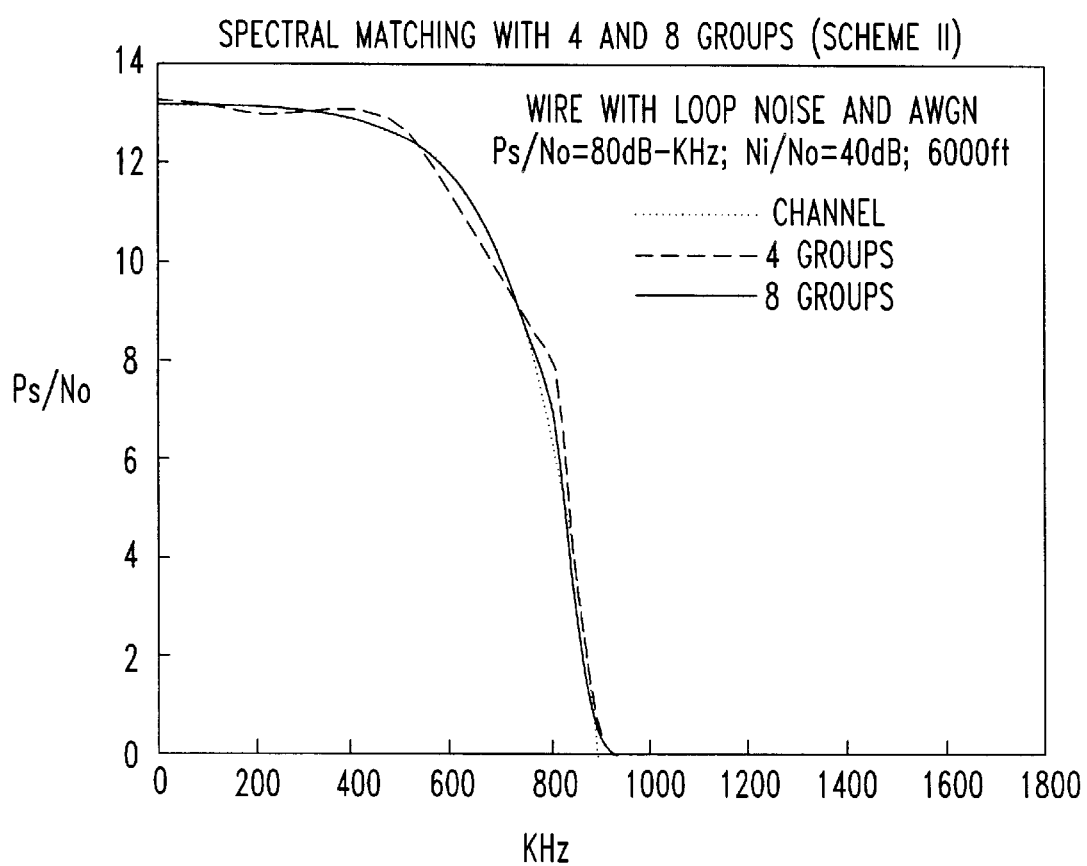
FIG. 8 is a graph of spectral matching OCDM with a twisted pair spectrum.

The graph of spectral matching versus frequency is shown in FIG. 8. As shown, the curves for the different groups are almost coincident with one another.

The invention claimed is:

1. A method for developing a signal adapted for transmission over a twisted pair wire comprising the steps of:
    forming a plurality of streams from data of one or more sources, and for each stream j of said plurality of streams performing the steps of:
    (a) applying to said stream j a $M_j$-PAM modulator that converts block of $k_j$ bits into symbols having $M_j$ levels, where $M_j=2^{k_j}$ thereby creating a $P_j$ modulated signal with a bandwidth related to selected integer value of ki;
    (b) splitting said signal $P_j$ into N substreams;
    (c) spreading each of said substreams with a different spreading code from an orthogonal code set, each of said different spreading codes being at a common rate $R_s$; and
    combining the spread signals to form said signal adapted for transmission.

2. A method of facilitating high speed data transit over a twisted pair, comprising the steps of:
    demultiplexing an incoming symbol stream having a rate $R_s$ into N parallel symbol streams with rate $R_s/N$;
    applying spreading techniques using orthogonal codes to increase each of the parallel symbol streams to a rate $N_s$;

summing all the parallel symbol streams and multiplying by a PN code of rate $R_s$ to form a plurality of output pulses; and shaping said plurality of output pulses so that its cumulative power spectra substantially matches a power transfer function of the twisted pair.

3. A method of matching a transfer characteristic of a serial stream of data with a power spectrum transfer characteristic of a twisted pair, comprising the steps of:

enhancing said stream with forward error correction information;

performing serial-to-parallel conversion on the enhanced stream, and modulating the converted signal to obtain pulse amplitude modulated signals in each of parallel branches;

splitting the signal of each parallel branch to form substreams;

spreading the signal of each parallel branch by multiplying each substream of the branch by a different code from a set of orthogonal codes;

summing the spread signals of the parallel branches to create a summed signal;

modifying density of the summed signal by overspreading with a PN cover code to form a white noise spectral distribution of energy; and filtering results of said modifying to alter spectral distribution of an output signal so as to approximate said transform function for the twisted pair.

4. The method of claim 1, wherein said $k_j$ values of said $M_j$-PAM modulators are chosen create a power spectrum density that when all spread signals are combined, achieves a combined power density characteristic approximating the twisted pair transfer function.

5. The method of claim 3 where number of said substreams is equal to number of codes in said set of orthogonal codes.

6. The method of claim 1, wherein said combining includes applying a PN cover code to said summed signal to create a signal with a spectrum that approximates white noise.

7. The method of claim 2, wherein each of the parallel streams is modulated by a different modulation loading to create a spectrum distribution substantially matching the transfer characteristic of the twisted pair.

8. The method of claim 2, wherein the PN code is orthogonal.

9. The method of claim 2, wherein each parallel stream is loaded to a different order of modulation so that combining the order generates a spectral density similar to the spectral density of the twisted pair.

10. The method of claim 3, wherein each signal on parallel branches is modulated to a different loading so that its cumulative power spectra approximated that of the transfer function of the twisted pair.

11. The method of claim 1, wherein said combining comprises the steps of summing each $P_j$ plurality of spread signals to form a channel signal;

modulating each channel signal with a code;

filtering each modulated channel signal; and summing the filtered signals.

12. The method of claim 1, wherein numbers of said modulated signals in the $P_j$ plurality of modulated signals, summed over all values of j, equals number of orthogonal codes in said orthogonal code set.

* * * * *